(12) United States Patent
Huang et al.

(10) Patent No.: US 12,089,143 B2
(45) Date of Patent: Sep. 10, 2024

(54) NETWORK SEARCH METHOD AND APPARATUS, DEVICE AND STORAGE MEDIUM

(71) Applicant: ONEPLUS TECHNOLOGY (SHENZHEN) CO., LTD., Guangdong (CN)

(72) Inventors: Yuyong Huang, Guangdong (CN); Hanxin Zhou, Guangdong (CN)

(73) Assignee: ONEPLUS TECHNOLOGY (SHENZHEN) CO., LTD., Shenzhen (CN)

( * ) Notice: Subject to any disclaimer, the term of this patent is extended or adjusted under 35 U.S.C. 154(b) by 509 days.

(21) Appl. No.: 17/502,648

(22) Filed: Oct. 15, 2021

(65) Prior Publication Data
US 2022/0039001 A1    Feb. 3, 2022

Related U.S. Application Data

(63) Continuation of application No. PCT/CN2020/084987, filed on Apr. 15, 2020.

(30) Foreign Application Priority Data

Apr. 15, 2019  (CN) .......................... 201910297931.5

(51) Int. Cl.
*H04W 48/16* (2009.01)
*H04W 60/00* (2009.01)

(52) U.S. Cl.
CPC .......... *H04W 48/16* (2013.01); *H04W 60/00* (2013.01)

(58) Field of Classification Search
CPC .............................. H04W 48/16; H04W 60/00
See application file for complete search history.

(56) References Cited

U.S. PATENT DOCUMENTS

| | | | |
|---|---|---|---|
| 2008/0212543 | A1 | 9/2008 | Ban |
| 2015/0271718 | A1 | 9/2015 | Gopal et al. |
| 2017/0135032 | A1 | 5/2017 | Huang et al. |
| 2018/0227839 | A1* | 8/2018 | Wang ...................... H04W 8/08 |

FOREIGN PATENT DOCUMENTS

| | | |
|---|---|---|
| CN | 1867129 A | 11/2006 |
| CN | 101980571 A | 2/2011 |
| CN | 105307241 A | 2/2016 |
| CN | 105611603 A | 5/2016 |
| CN | 107105478 A | 8/2017 |
| CN | 108668339 A | 10/2018 |
| CN | 108702667 A | 10/2018 |

(Continued)

OTHER PUBLICATIONS

International Search Report In the international application No. PCT/CN2020/084987, mailed on Jul. 1, 2020.

(Continued)

*Primary Examiner* — Kabir A Timory
(74) *Attorney, Agent, or Firm* — Ladas and Parry LLP

(57) ABSTRACT

A method for network search includes: an equivalent frequency point of a stored frequency point is acquired, the stored frequency point includes a frequency point of a registered network; and a mobile network is searched for according to the equivalent frequency point, to determine a mobile network to be registered.

15 Claims, 10 Drawing Sheets

(56) References Cited

FOREIGN PATENT DOCUMENTS

| | | |
|---|---|---|
| CN | 110049535 A | 7/2019 |
| WO | 2018145468 A1 | 8/2018 |
| WO | 2018214960 A1 | 11/2018 |

OTHER PUBLICATIONS

First Office Action of the Chinese application No. 201910297931.5, issued on Nov. 18, 2020.
Second Office Action of the Chinese application No. 201910297931.5, issued on Jun. 9, 2021.
Written Opinion of the International Search Authority in the international application No. PCT/CN2020/084987, mailed on Jul. 1, 2020.
Third Office Action of the Chinese application No. 201910297931.5, issued on Nov. 1, 2021.
Notice of Allowance of the Chinese application No. 201910297931.5, issued on Feb. 23, 2022.

* cited by examiner

NETWORK SEARCH METHOD AND APPARATUS, DEVICE AND STORAGE MEDIUM

CROSS-REFERENCE TO RELATED APPLICATIONS

This application is a continuation of International Application No. PCT/CN2020/084987 filed on Apr. 15, 2020, which claims priority to Chinese Patent Application No. 201910297931.5 filed on Apr. 15, 2019. The disclosures of these applications are hereby incorporated by reference in their entirety.

TECHNICAL FIELD

The disclosure relates to the technical field of computers but is not limited thereto, and in particular to a method and apparatus for network search, a device, and a storage medium.

BACKGROUND

When a terminal device is powered on or is not under service, the terminal device needs to perform network searching to acquire mobile network signals, so as to complete its network registration.

SUMMARY

Based on the above embodiments of the disclosure provide a method and apparatus for network search, a device, and a storage medium.

According to a first aspect, there is provided a method for network search, which may include the following operations: an equivalent frequency point of a stored frequency point is acquired, where the stored frequency point includes a frequency point of a registered network; and a mobile network is searched for according to the equivalent frequency point, to determine a mobile network to be registered.

According to a second aspect, there is provided an apparatus for network search, which may include a memory storing processor-executable instructions; and a processor configured to execute the stored processor-executable instructions to perform operations of: acquiring an equivalent frequency point of a stored frequency point, the stored frequency point including a frequency point of a registered network; and searching for a mobile network according to the equivalent frequency point, to determine a mobile network to be registered.

According to a third aspect, there is provided a non-transitory computer-readable storage medium having stored thereon computer-readable instructions that, when executed by a processor, cause the processor to perform a method for network search, the method including: acquiring an equivalent frequency point of a stored frequency point, the stored frequency point including a frequency point of a registered network; and searching for a mobile network according to the equivalent frequency point, to determine a mobile network to be registered.

DETAILED DESCRIPTION

The disclosure provides a method and apparatus for network search, a device, and a storage medium, which are intended to solve the problem of a long time for network search in case of no networks. The technical solutions of the disclosure and how to solve the above technical problem by the technical solutions of the disclosure will be described in detail in some embodiments below with reference to the embodiments and accompanying drawings. The following specific embodiments may be mutually combined, and the same or similar concepts or processes may not be elaborated in some embodiments.

Figure 1:
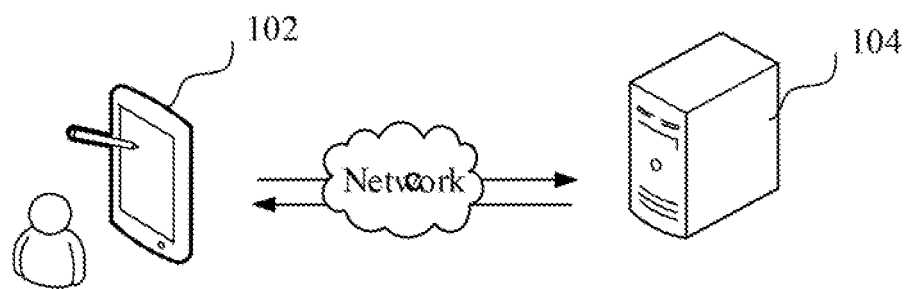
FIG. 1 is a schematic diagram of an application environment of a method for network search according to an embodiment.

The method for network search provided in the embodiments is applicable to an application environment shown in FIG. 1. A terminal 102 for network search is in communication with a server 104 through a network. The terminal for network search may be an electronic device having a data processing function, such as a smart phone, a tablet computer, a laptop computer, a desktop computer, or a personal digital assistant, etc. The specific form of the terminal for network search is not limited in the embodiments. The server 104 may be implemented by an individual server or a server cluster composed of multiple servers.

It should be noted that an executive subject or the method for network search provided in the embodiment of the disclosure may be an apparatus for network search which may be implemented as part or all of the terminals for network search by a software, a hardware, or a combination of software and hardware.

In order to make the objectives, technical solutions and advantages of the embodiments of the disclosure clearer, the technical solutions in the embodiments of the disclosure will be clearly and completely described below in combination with the drawings in the embodiments of the disclosure. It is apparent that the described embodiments are not all embodiments but part of the embodiments of the disclosure.

The embodiments of the disclosure provide a method for network search, which includes the following operations.

An equivalent frequency point of a stored frequency point is acquired, where the stored frequency point includes a frequency point of a registered network.

A mobile network is searched for according to the equivalent frequency point, to determine a mobile network to be registered.

Here the registered network refers to one or more networks historically registered by the terminal before a current time, or may also be referred to as a historically registered network. In some embodiments, the registered network includes a previous network registered by the terminal.

Figure 2:
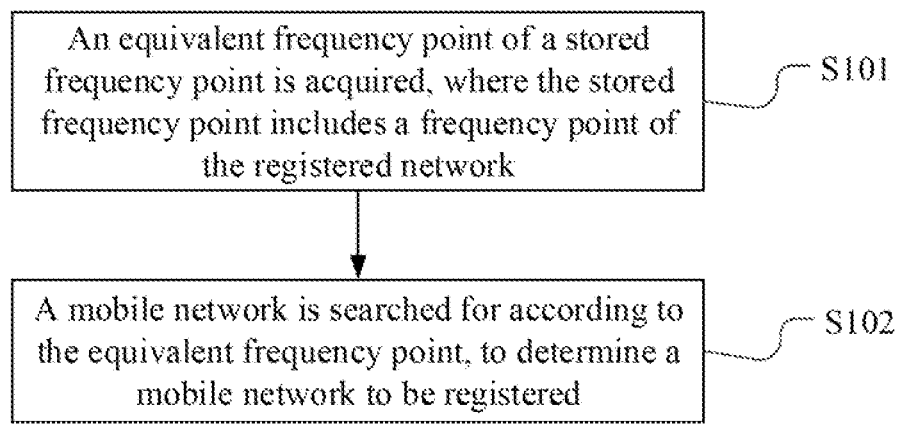
FIG. 2 is a schematic flowchart of a method tor network search according to an embodiment.

FIG. 2 is a schematic flowchart of a method for network search according to an embodiment. The embodiment relates to illustration of a process of searching for a mobile network through an equivalent frequency point when the terminal does not search out any mobile networks according to a stored frequency point. As shown in FIG. 2, the method includes the following operations.

In operation S101, an equivalent frequency point of a stored frequency point is acquired according to a registered network, the registered network is a mobile network on which the terminal registered last time, and the stored frequency point is a frequency point corresponding to the registered network.

The registered network may be a mobile network on which the terminal registered last time, the mobile network may be a mobile network provided by an operator, the terminal device registers the mobile network and performs network communication through the mobile network. The stored frequency point may be a frequency point stored in the terminal device. When the terminal device registered a mobile network last time, a frequency point corresponding to the mobile network is stored into the terminal device, that is, the stored frequency point. One operator may provide multiple mobile networks, and each of the mobile networks corresponds to multiple frequency points. The equivalent frequency point may be a frequency point corresponding to another mobile network provided by the operator that provides the registered network, and may be one frequency point or multiple frequency points, the embodiment of the disclosure is not limited thereto.

In some embodiments, the terminal may acquire, according to a registered network, an equivalent frequency point corresponding to the registered network. Specifically, the terminal may acquire, according to the registered network, operator information corresponding to the registered network, and then acquire, according to the operator information, a frequency point corresponding to another mobile network enrolled by an operator corresponding to the operator information, such frequency point is the equivalent frequency point; or the terminal may acquire, according to operator information, a frequency point that has registered by the terminal on another mobile network provided by an operator corresponding to the operator information, such frequency point is the equivalent frequency point; and the embodiments of the disclosure are not limited thereto. For example, a terminal registers a mobile network A provided by an operator 1 through a frequency point a at a first location, and the terminal registered a mobile network B provided by the operator 1 through a frequency point b at a second location last time. A stored frequency point of the terminal is the frequency point b, the mobile network B is a registered network, both the mobile network B and the mobile network A are mobile networks provided by the operator 1, that the frequency point a may be determined as an equivalent frequency point according to the registered network B.

In operation S102, a mobile network is searched for according to the equivalent frequency point, to determine a mobile network to be registered.

In some embodiments, based on the above embodiment, after determining the equivalent frequency point, the terminal may search for a mobile network according to the equivalent frequency point, to determine the mobile network to be registered. There may be one frequency point or multiple frequency points. When the equivalent frequency point refers to one frequency point, the terminal searches for the mobile network through the frequency point so as to determine the mobile network to be registered. When the equivalent frequency point refers to multiple frequency points, the terminal searches for the mobile network through one of the frequency points; when a mobile network corresponding to the frequency point can be searched out, the mobile network is determined as the mobile network to be registered; when a mobile network corresponding to the frequency point cannot be searched out, a next equivalent frequency point is adopted to search for the mobile network, until the mobile network corresponding to the equivalent frequency point is searched out, so that the mobile network is determined as the mobile network to be registered. For example, based on the above embodiment, the terminal acquires five equivalent frequency points, which are a frequency point 1, a frequency point 2, a frequency point 3, a frequency point 4, and a frequency point 5, respectively. The terminal first searches for the mobile network through the frequency point 1, but fails to search out a mobile network corresponding to the frequency point 1; then the terminal searches for the mobile network through the frequency point 2, but fails to search out a mobile network corresponding to the frequency point 2; and then the terminal searches tier the mobile network through the frequency point 3 and finds out a mobile network corresponding to the frequency point 3, so that the mobile network is determined as the mobile network to be registered.

In the above method for network search, the terminal acquires the equivalent frequency point of the stored frequency point according to the registered network, here the registered network is a mobile network on which the terminal registered last time, and the stored frequency point is a frequency point corresponding to the registered network, then the terminal searches for the mobile network according to the equivalent frequency point, to determine the mobile network to be registered, so that the terminal may search for a mobile network without a full-band search method when the mobile network cannot be searched out according to the stored frequency point, thereby shortening time for network search and improving efficiency of network search.

In the operation S102, it is no longer to perform registration by directly per network searching at all frequency points, but to register a network of the equivalent frequency point corresponding to the frequency point of the registered network first, so that search volume is reduced with registration efficiency improved, while a registration success rate is increased.

In some embodiments, a mobile network is searched for according to the equivalent frequency point, and a searched mobile network is registered; when the registration or the search fails, network search is performed according to all frequency points of the network.

The above embodiments focus on description of a specific process of determining a mobile network to be registered, according to the equivalent frequency point, in case where the terminal does not search out the mobile network according to the stored frequency point. A specific process that how the terminal acquires an equivalent frequency point through a registered network will be described in detail below according to embodiments shown in FIGS. 3 to 5.

Figure 3:
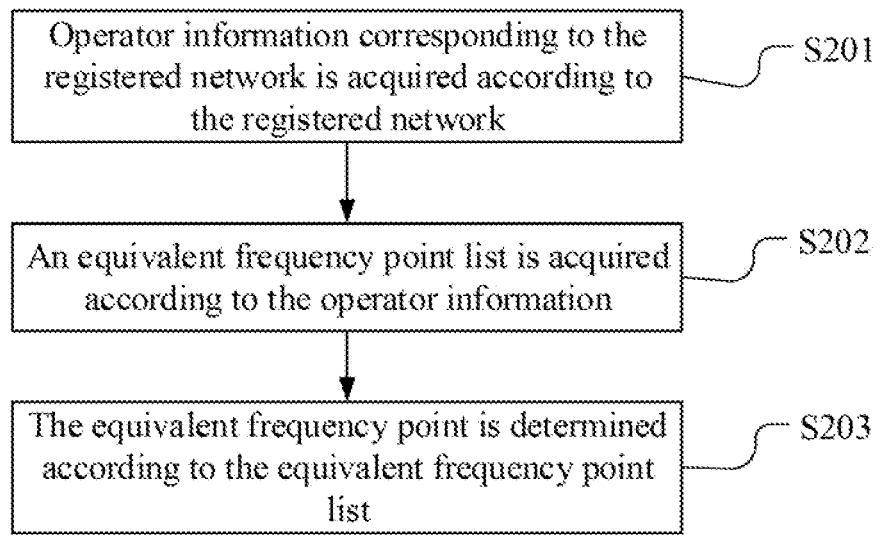
FIG. 3 is a schematic flowchart of a method for network search according to another embodiment.

FIG. 3 is a schematic flowchart of a method for network search according to another embodiment. The embodiment relates to the specific process that how the terminal acquires an equivalent frequency point through a registered network. As shown in FIG. 3, a possible implementation of the operation S102 "in, response to failing to search out a mobile network, a registered network is searched according to networks, to acquire an equivalent frequency point of the stored frequency point for network search" includes the following operations.

In operation S201, operator information corresponding to the registered network is acquired according to the registered network.

The operator information may include information about an operator providing the registered network, which may include the operator's name, code name or other information indicating the identity of the operator. The operator information may also include information of multiple mobile networks provided by the operator and frequency point information corresponding to each of the mobile networks. The embodiment of the disclosure is not limited thereto.

In some embodiments, based on the above embodiment, the terminal may acquire operator information of an operator providing the registered network, according to the registered network. For example, the registered network is a mobile network A and an operator 1 provides the mobile network A, the terminal may determine that operator information corresponding to the registered network A is the operator 1, according to the operator 1 providing the registered network A.

In operation S202, an equivalent frequency point list is acquired according to the operator information.

The equivalent frequency point, list may include an equivalent frequency point, or may also a set of multiple equivalent frequency points, the embodiment of the disclosure is not limited thereto. When the equivalent frequency point list includes multiple equivalent frequency points, the equivalent frequency point list may be a set of multiple equivalent frequency points arranged randomly, or may be a set of multiple equivalent frequency points arranged in a preset rule, the embodiment of the disclosure is not limited thereto. For example, the equivalent frequency point list includes three equivalent frequency points, which are an equivalent frequency point 1, an equivalent frequency point 2 and an equivalent frequency point 3, respectively. A mobile network corresponding to the equivalent frequency point 1 is a Fourth-Generation (4G) network, a mobile network corresponding to the equivalent frequency point 2 is a Third-Generation (3G) network, and a mobile network corresponding to the equivalent frequency point 3 is a Second-generation (2G) network. The terminal may sort the equivalent frequency point 1, the equivalent frequency point 2 and the equivalent frequency point 3 according to characteristics of the mobile networks corresponding to the equivalent frequency points, so as to obtain an equivalent frequency point list {equivalent frequency point 1; equivalent frequency point 2; equivalent frequency point 3}.

In some embodiments, based on the above embodiment, the terminal may acquire an equivalent frequency point list according to the operator information. In a specific process of acquiring the equivalent frequency point list according to operator information, the terminal may acquire, according to operator's name included in the operator information, multiple mobile networks provided by the operator, and further acquire, according to the multiple mobile networks, multiple frequency points corresponding to each of the mobile networks, so as to collect the multiple frequency points to obtain the equivalent frequency point list; or the terminal may directly acquire, according, to the operator's name included in the operator information, multiple frequency points enrolled in a certain server by the operator, so as to collect the multiple frequency points to obtain the equivalent frequency point list. Furthermore, the terminal may acquire, according to the operator information, multiple registered mobile networks provided by the operator corresponding to the operator information, and further acquire multiple frequency points used when the terminal registers the multiple mobile networks, so as to collect the multiple frequency points to obtain the equivalent frequency point list. The embodiment of the disclosure is not limited thereto.

In operation S203, the equivalent frequency point is determined according to the equivalent frequency point list.

In some embodiments, based on the above embodiment, after acquiring the equivalent frequency point list, the terminal may determine all frequency points in the equivalent frequency point list as equivalent frequency points, or may select part of frequency points in the equivalent frequency point list as equivalent frequency points, the embodiment of the disclosure is not limited thereto. For example, the equivalent frequency point list includes five frequency points, which are a frequency point 1, a frequency point 2, a frequency point 3, a frequency point 4 and a frequency point 5, respectively. A mobile network 1 corresponding to the frequency point 1 is a 4G network, the mobile network 1 corresponding to the frequency point 2 is a 4G mobile network, a mobile network 2 corresponding to the frequency point 3 is a 4G network, a mobile network 3 corresponding to the frequency point 4 is a 3G network, and a mobile network 4 corresponding to the frequency point 5 is a 2G network. The terminal may select the frequency points corresponding to the 3G network and the 4G network as equivalent frequency points, i.e., the frequency point 1, the frequency point 2, the frequency point 3 and the frequency point 4.

In the above method for network search, the terminal acquires, according to the registered network, the operator information corresponding to the registered network, and acquires the equivalent frequency point list according to the operator information, and further determines the equivalent frequency point according to the equivalent frequency point list; thus the equivalent frequency point is automatically acquired by the terminal, then a mobile network is searched for according to the equivalent frequency point to determine the mobile network to be registered, so that automation level of determining the network to be registered is increased, and efficiency of network search is increased in an embodiment.

Figure 4:
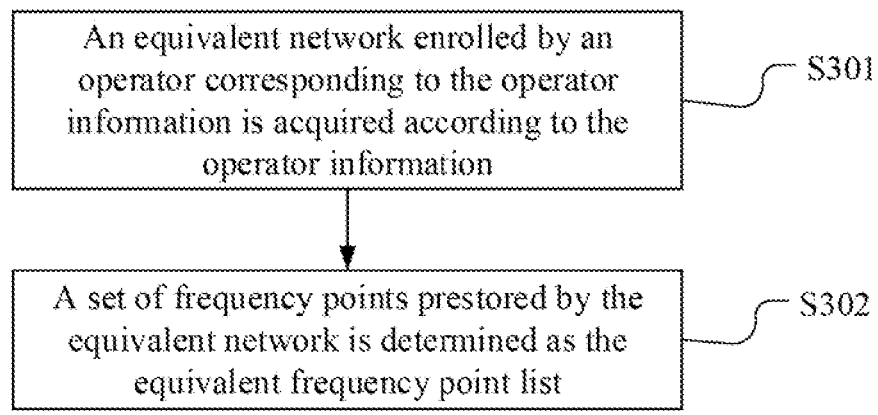
FIG. 4 is a schematic flowchart of a method for network search according to another embodiment.

FIG. 4 is a schematic flowchart of a method for network search according to another embodiment. The embodiment relates to a specific process that how the terminal acquire an equivalent frequency point list through operator information. As shown in FIG. 4, a possible implementation of the operation S202 "the equivalent frequency point list is acquired according to the operator information" includes the following operations.

In operation S301, an equivalent network enrolled by an operator corresponding to the operator information is acquired according to the operator information.

In some embodiments, an operator may provide multiple mobile networks. A mobile network registered by the terminal last time may be a registered network. Other mobile networks provided by the operator are equivalent networks of the registered network. Generally, the operator may enroll all mobile networks provided by the operator in a certain server for viewing. The terminal may access the server to acquire multiple networks enrolled by the operator corresponding to the operator information, and determine other mobile networks other than the last registered mobile network as equivalent networks. The above multiple mobile networks may be prestored in the terminal before it leaves the factory. During usage, the terminal may determine other mobile networks as equivalent networks according to the registered network; or during usage, the terminal may update the above multiple mobile networks in real time, and further determine other mobile networks as equivalent networks according to the registered network. The embodiment of the disclosure is not limited thereto.

In operation S302, a set of frequency points prestored by the equivalent network is determined as the equivalent frequency paint list.

In some embodiments, based on the above embodiment, after acquiring the equivalent network, the terminal may collect frequency points prestored in the equivalent network to obtain the equivalent frequency point list. The equivalent network acquired by the terminal may be one equivalent network, or may be multiple equivalent networks. When the equivalent network acquired by the terminal refers to one mobile network, the mobile terminal may prestore one or multiple frequency points, and a set of the one or more frequency points is determined as the equivalent frequency point list. When the equivalent network acquired by the terminal refers to multiple mobile networks, a set of multiple frequency points prestored in each of the mobile networks is determined as the equivalent frequency point list. Or, part of the equivalent networks is selected, and a set of multiple frequency points prestored in the selected part of equivalent networks is determined as the equivalent frequency point list. The embodiment of the disclosure is not limited thereto. For example, the equivalent network acquired by the terminal includes three mobile networks, which are an equivalent network 1, an equivalent network 2 and an equivalent network 3, respectively. The mobile network corresponding to the equivalent network 1 is a 4G network, the mobile, network corresponding to the equivalent network 2 is a 4G network, and the mobile network corresponding to the equivalent network 3 is a 3G network. The terminal may select a set of frequency points prestored in the 4G network as the equivalent frequency point list, that is, may select a set of frequency points prestored in the equivalent network 1 and the equivalent network 2 as the equivalent frequency point list.

In the above method for network search, the terminal acquires, according to the operator information, the equivalent network enrolled by the operator corresponding to the operator information, and determines the set of frequency points prestored in the equivalent network as the equivalent frequency point list, and further searches for the mobile network according to the equivalent frequency point, to determine the mobile network to be registered, so that the terminal may search for a mobile network without a full-band search method when the mobile network cannot be searched out according to the stored frequency point, thereby shortening time for network search and improving efficiency of network search.

In an embodiment, based on the above embodiment, the terminal may also update the equivalent frequency point list according to a frequency point corresponding to a mobile network registered last time, which will be described in detail below through the embodiment shown in FIG. 5.

Figure 5:
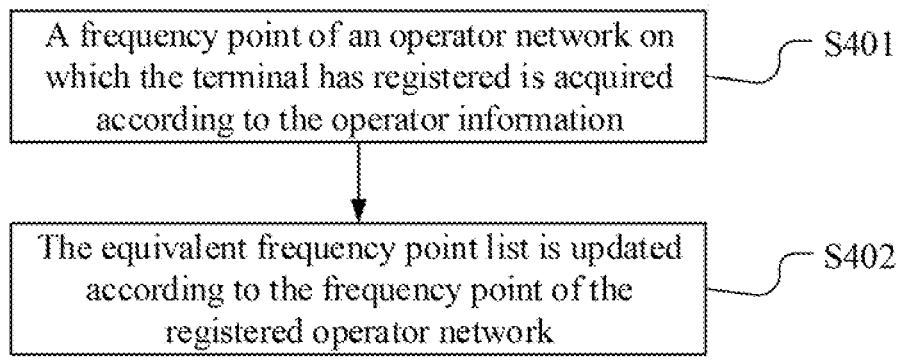
FIG. 5 is a schematic flowchart of a method fir network search according to another embodiment.

FIG. 5 is a schematic flowchart of a method for network search according to another embodiment. The embodiment relates to a specific process that how the terminal acquires an equivalent frequency point list through operator information. As shown in FIG. 5, a possible implementation of the operation S202 "the equivalent frequency point list is acquired according to the operator information" includes the following operations.

In operation S401, a frequency point of an operator network on which the terminal has registered is acquired according to the operator information.

In some embodiments, based on the above embodiment, the terminal may also acquire, according to the operator information, a frequency point when the terminal registers multiple networks provided by the operator corresponding to the operator information. The frequency point may be one frequency point, or may also be multiple frequency points, the embodiment of the disclosure is not limited thereto. When the operator provides mobile networks, a newly added frequency point corresponding to a broadcast control channel has not been enrolled in the above server. Therefore, the terminal cannot acquire the frequency point by accessing the server. The terminal may acquire the frequency point since the terminal has registered the mobile network through the frequency point and the frequency point is stored in the terminal.

In operation S402, the equivalent frequency point list is updated according, to the frequency point of the registered operator network.

In some embodiments, based on the above embodiment, after acquiring the frequency point of the registered operator network, the terminal may update the equivalent frequency point list according to the frequency point. Specifically, the terminal may update the equivalent frequency point list by directly putting the frequency point into the equivalent frequency point list; or the terminal may also evaluate the frequency point to determine whether the frequency point may meet an equivalent frequency point requirement, and put the frequency point meeting the requirement into the equivalent frequency point list to update the equivalent frequency point list. For example, based on the above embodiment, the terminal acquires three frequency points, which are a frequency point 1, a frequency point 2 and a frequency point 3, respectively. A mobile network corresponding to the frequency point 1 is a 4G network, a mobile network corresponding to the frequency point 2 a 3G mobile network, and a mobile network corresponding to the frequency point 3 is a 2G network. The equivalent frequency point requirement is a frequency point corresponding to the 3G network or the 4G network. Therefore, the frequency point 1, and the frequency point 2 are frequency points meeting the requirement. The frequency point 1 and the frequency point 2 are put into the equivalent frequency point list to update the equivalent frequency point list.

In the above method for network search, the terminal acquires, according to the operator information, the frequency point of the operator network on which the terminal has registered, and updates the equivalent frequency point list according to the frequency point of the registered operator network. In the embodiment, in the process of network search, not only the frequency point enrolled by the operator is used, but also the frequency points that have been used while have not been enrolled by the operator are used. Therefore, application of the full-band search is avoided when the terminal fails to search out the mobile network through the frequency point enrolled by the operator. The efficiency of network search is improved in an embodiment.

Based on the above embodiment, when determining the equivalent frequency point, the terminal may search for a mobile network according to the equivalent frequency point, to determine a mobile network to be registered, which will be described in detail below through the embodiment shown in FIG. 6.

Figure 6:
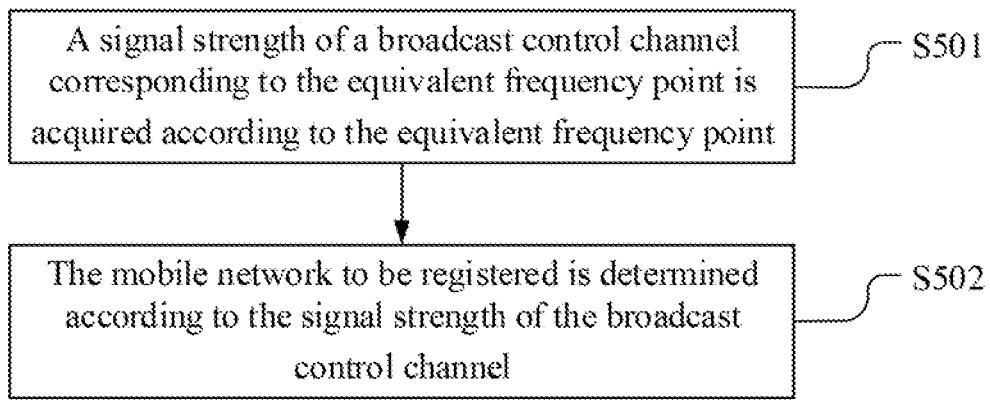
FIG. 6 is a schematic flowchart of a method for network search according to another embodiment.

FIG. 6 is a schematic flowchart of a method for network search according to another embodiment. The embodiment relates to a specific process that how the terminal determines a mobile network to be registered according to an equivalent frequency point. As shown in FIG. 6, an implementation of the operation S103 "a mobile network is searched for according to the equivalent frequency point, to determine the mobile network to be registered" includes the following operations.

In operation S501, a signal strength of a broadcast control channel corresponding to the equivalent frequency point is acquired according to the equivalent frequency point.

In some embodiments, the terminal may acquire, according to the equivalent frequency point, a signal strength of a broadcast control channel corresponding to the equivalent frequency point. Each broadcast control channel corresponds to a frequency point, while each broadcast control channel further corresponds to a mobile network. The terminal device may search, according to the frequency point, the broadcast control channel corresponding to the frequency point, and acquire the signal strength of the searched-out broadcast control channel. The signal strength may be a signal strength of a received signal directly read by the terminal, or may be a filtered signal strength that is read after a received signal is filtered to remove interference information therein, the embodiment of the disclosure is not limited thereto.

In operation S502, the mobile network to be registered is determined according to the signal strength of the broadcast control channel.

In some embodiments, based on the above embodiment, the terminal acquires the signal strength of the broadcast control channel, and may determine the mobile network to be registered, according to the signal strength. In an embodiment, in response to the signal strength of the broadcast control channel being greater than a preset threshold, a mobile network corresponding to the broadcast control channel is determined as the mobile network to be registered. The preset threshold may be a value prestored in the terminal, or may also be a value obtained by the terminal through real-time adjustment according to signal strengths corresponding to registration of networks for multiple times during usage, the embodiment of the disclosure is not limited thereto. When the signal strength of the broadcast control channel is greater than the preset threshold, a mobile network corresponding to the broadcast control channel is determined as the mobile network to be registered.

In an embodiment, in response to the signal strength of the broadcast control channel corresponding to the equivalent frequency point being not greater than the preset threshold, a signal strength of a broadcast control channel corresponding to a next equivalent frequency point is acquired, and the mobile network to be registered is determined according to the signal strength of the broadcast control channel corresponding to the next equivalent frequency point.

In some embodiments, when the signal strength of the broadcast control channel corresponding to the equivalent frequency point is not greater than the preset threshold, the terminal may acquire a signal strength of a broadcast control channel corresponding to a next equivalent frequency point. When the signal strength of the broadcast control channel corresponding to the next equivalent frequency point is greater than the preset threshold, a mobile network corresponding to the broadcast control channel is determined as the mobile network to be registered. When the signal strength of the broadcast control channel corresponding to the next equivalent frequency point is not greater than the preset threshold, assuming that the next equivalent frequency point is a first next equivalent frequency point, then a signal strength of a broadcast control channel corresponding to a second next equivalent frequency point may be acquired continuously according the second next equivalent frequency point, so as to determine the mobile network to be registered.

In the above method for network search, the terminal acquires, according to the equivalent frequency point, the signal strength of the broadcast control channel corresponding to the equivalent frequency point, and determines the mobile network to be registered, according to the signal strength of the broadcast control channel. Thus, the terminal determines the mobile network to be registered, by determining the signal strength of the broadcast control channel, so that the problem that the terminal determines the network to be registered, based on the frequency point only, resulting in a poor signal of the network to be registered is avoided, and accuracy of network search is improved.

In an embodiment, the terminal may acquire, according to a stored frequency point, a signal strength of a broadcast control channel corresponding to the stored frequency point, and further determine the mobile network to be registered, according to the signal strength of the broadcast control channel corresponding to the stored frequency point. When the signal strength of the broadcast control channel corresponding to the stored frequency point is greater than a preset threshold, a mobile network corresponding to the broadcast control channel is determined as the mobile network to be registered. When the signal strength of the broadcast control channel corresponding to the stored frequency point is not greater than the preset threshold, a signal strength of a broadcast control channel corresponding to an equivalent frequency point is acquired, and the mobile network to be registered is determined according, to the signal strength of the broadcast control channel corresponding to the equivalent frequency point.

It should be understood that although various steps in the flowcharts of FIGS. 2 to 6 are displayed in sequence according to the indication of arrows, these steps are not necessarily performed in sequence in the order indicated by the arrows. Unless specifically stated herein, the steps are not performed in a strict order of limitation, and the steps may be performed in other orders. Moreover, at least some steps in FIGS. 2 to 6 may include multiple sub-steps or multiple stages, these sub-steps or stages are not necessarily performed or completed at the same moment but may be performed at different moments, and these sub-steps or stages are not necessarily performed in sequence.

Figure 7:
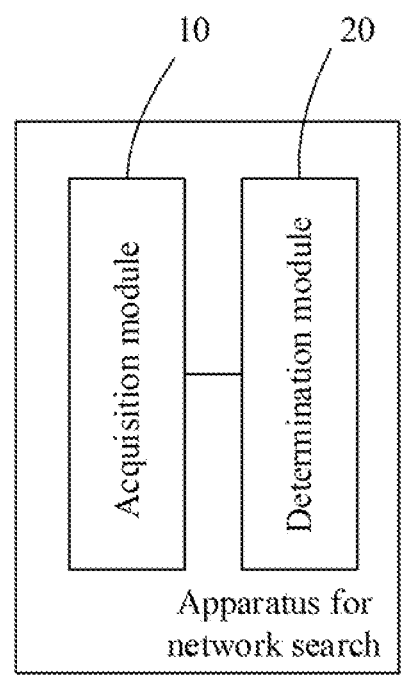
FIG. 7 is a schematic structural diagram or an apparatus for network search according to an embodiment.

FIG. 7 is a schematic structural diagram of an apparatus for network search according to an embodiment. As shown in FIG. 7, the apparatus for network search includes an acquisition module 10 and a determination module 20.

The acquisition module 10 is configured to acquire an equivalent frequency point of a stored frequency point, the stored frequency point including a frequency point of a registered network. For example, the acquisition module 10 is configured to acquire an equivalent frequency point of a stored frequency point according to a registered network, the registered network is a mobile network on which the terminal registered last time, and the stored frequency point is a frequency point corresponding to the registered network.

The determination module 20 is configured to search for a mobile network according to the equivalent frequency point, to determine a mobile network to be registered.

Figure 8:
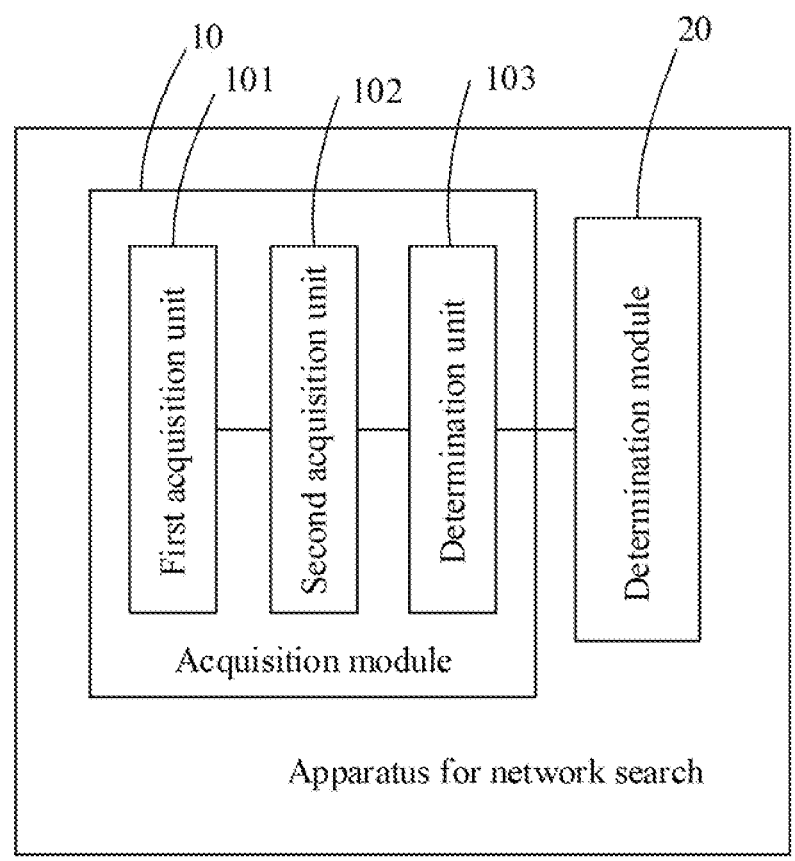
FIG. 8 is a schematic structural diagram of an apparatus for network search according to another embodiment.

FIG. 8 is a schematic structural diagram of an apparatus for network search according to another embodiment. Based on the above embodiment shown in FIG. 7, the acquisition module 10 includes a first acquisition unit 101, a second acquisition unit 102 and a first determination unit 103.

The first acquisition unit 101 is configured to acquire, according to the registered network, operator information corresponding to the registered network.

The second acquisition unit 102 is configured to acquire an equivalent frequency point list according to the operator information.

The first determination unit 103 is configured to determine the equivalent frequency point according to the equivalent frequency point list.

In an embodiment, when other sensors refer to laser radars, the second acquisition unit 102 is configured to acquire, according to the operator information, an equivalent network enrolled by an operator corresponding to the operator information; and determine a set of frequency points prestored by the equivalent network as the equivalent frequency point list.

In an embodiment, the second acquisition unit 102 is further configured to acquire, according to the operator information, a frequency point of an operator network on which the terminal has registered; and update the equivalent frequency point list according to the frequency point of the registered operator network.

The apparatus for network search provided in the embodiment of the disclosure may execute the above method embodiments, and has the similar implementation principle and technical effects, which will not be elaborated here.

Figure 9:
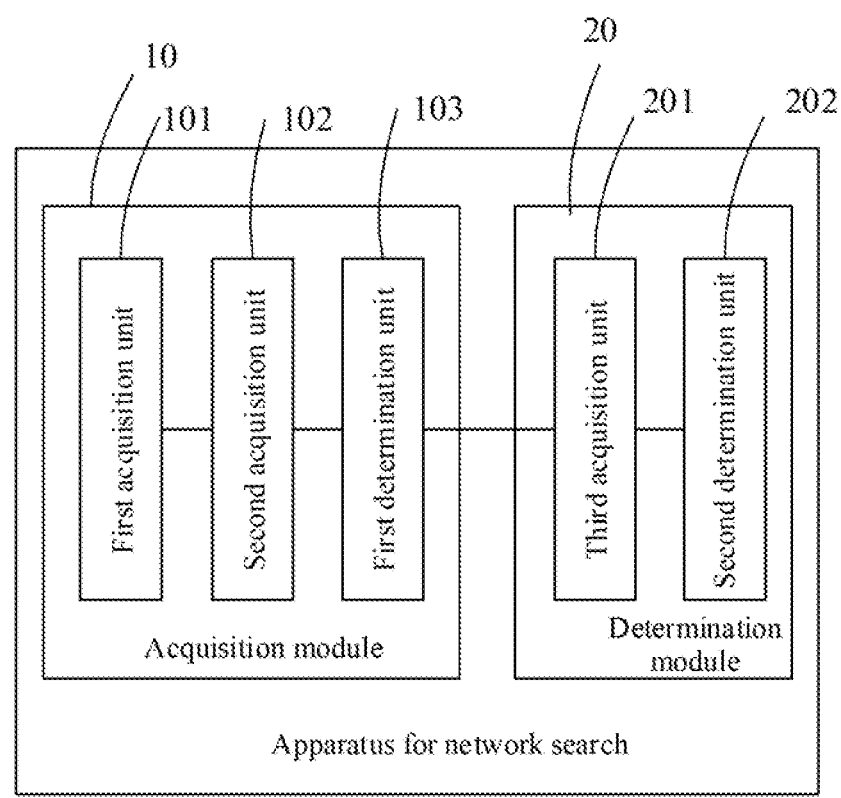
FIG. 9 is a schematic structural diagram of an apparatus for network search according to another embodiment.

FIG. 9 is a schematic structural diagram of an apparatus for network search according to another embodiment. Based on the above embodiment shown in FIG. 7 or FIG. 8, the determination module 20 includes a third acquisition unit 201 and a second determination unit 202.

The third acquisition unit 201 is configured to acquire, according to the equivalent frequency point, a signal strength of a broadcast control channel corresponding to the equivalent frequency point.

The second determination unit 202 is configured to determine the mobile network to be registered, according to the signal strength of the broadcast control channel.

In an embodiment, in response to the signal strength of the broadcast control channel being greater than a preset threshold, a mobile network corresponding to the broadcast control channel is determined as the mobile network to be registered.

In an embodiment, in response to the signal strength of the broadcast control channel corresponding to the equivalent frequency point being not greater than the preset threshold, a signal strength of a broadcast control channel corresponding to a next equivalent frequency point is acquired, and the mobile network to be registered is determined according to the signal strength of the broadcast control channel corresponding to the next equivalent frequency point.

The apparatus for network search provided in the embodiment of the disclosure may execute the above method embodiments, and has the similar implementation principle and technical effects, which will not be elaborated here.

Specific limitations of the apparatus for network search may refer to the above limitations of the method for network search, which will not be elaborated here. Various modules in the above apparatus for network search may be implemented by a software, a hardware or a combination of software and hardware completely or partially. Various modules may be embedded into or dependent from a processor of a computer device in the form of a hardware, or may also be stored in a memory of the computer device in the form of a software, so that the processor calls them to perform the operations corresponding to various modules.

In an embodiment, there is provided a computer device. The computer device may be a terminal, and an internal structure diagram of the computer device may be shown in FIG. 10. The computer device includes a processor, a memory, a network interface, a display screen and an input apparatus connected by a system bus. The processor of the computer device is configured to provide computing and control capabilities. The memory of the computer device includes a non-volatile storage medium and an internal memory. The non-volatile storage medium stores an operating system and a computer program. The internal memory provides an environment for the execution of the operating system and the computer program in the non-volatile storage medium. The network interface of the computer device is configured to communicate with an external terminal through a network connection. The computer device is executed by the processor to implement a method for network search. The display screen of the computer device may be a liquid crystal display (LCD) screen or an electronic ink display screen. The input apparatus of the computer device may be a touch screen covering the display screen, or may be a button, a trackball or a trackpad disposed on a housing of the computer device, or may also be an external keyboard, a trackpad or a mouse.

Figure 10:
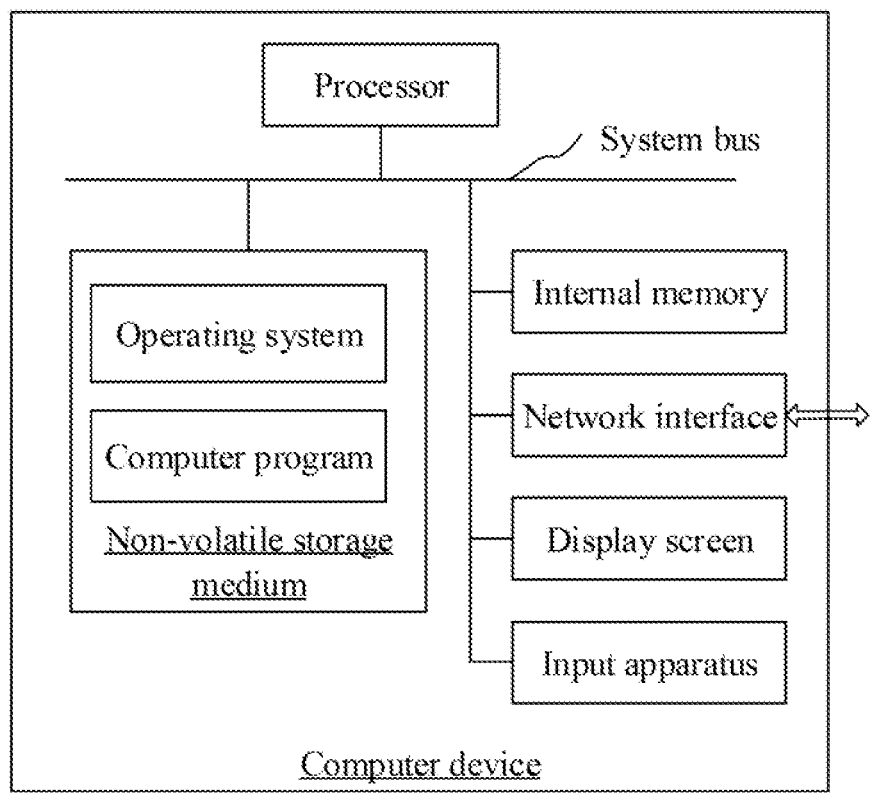
FIG. 10 is an internal structure diagram of a computer device according to an embodiment.

Those skilled in the art may understand that the structure shown in FIG. 10 is only a block diagram of part of the structures associated with the solution of the disclosure, and does not limit to the computer device to which the solution of the disclosure is applied. Specifically, the computer device may include parts more or fewer than those shown in the figure, or combine some parts, or have different part arrangements.

In an embodiment, there is provided a computer device which includes a memory having stored thereon a computer program and a processor, here the processor, when executing the computer program, implements the following operations.

An equivalent frequency point of a stored frequency point is acquired according to a registered network, the registered network is a mobile network on which the terminal registered last time, and the stored frequency point is a frequency point corresponding to the registered network.

A mobile network is searched for according to the equivalent frequency point, to determine a mobile network to be registered.

In an embodiment, the processor, when executing the computer program, further implements the following operations: operator information corresponding to the registered network is acquired according to the registered network; an equivalent frequency point list is acquired according to the operator information; and the equivalent frequency point is determined according to the equivalent frequency point list.

In an embodiment, the processor, when executing the computer program, further implements the following operations: an equivalent network enrolled by an operator corresponding to the operator information is acquired according to the operator information; and a set of frequency points prestored by the equivalent network is determined as the equivalent frequency point list.

In an embodiment, the processor, when executing the computer program, further implements the following operations: a frequency point of an operator network on which the terminal has registered is acquired according to the operator information; and the equivalent frequency point list is updated according to the frequency point of the registered operator network.

In an embodiment, the processor, when executing the computer program, further implements the following operations: a signal strength of a broadcast control channel corresponding to the equivalent frequency point is acquired according to the equivalent frequency point; and the mobile network to be registered is determined according to the signal strength of the broadcast control channel.

In an embodiment, in response to the signal strength of the broadcast control channel being greater than a preset threshold, a mobile network corresponding to the broadcast control channel is determined as the mobile network to be registered.

In an embodiment, in response to the signal strength of the broadcast control channel corresponding to the equivalent frequency point being not greater than a preset threshold, a signal strength of a broadcast control channel corresponding to a next equivalent frequency point is acquired, and the mobile network to be registered is determined according to the signal strength of the broadcast control channel corresponding to the next equivalent frequency point.

The computer device provided in the embodiment of the disclosure has the implementation principle and technical effects similar to those of the above method embodiments, which will not be elaborated here.

In an embodiment, there is provided a computer-readable storage medium having stored thereon a computer program, here the computer program, when being executed by a processor, implements the following operations.

An equivalent frequency point of a stored frequency point is acquired, where the stored frequency point includes a frequency point of a registered network. For example, it may include, but is not limited to the following operations: an equivalent frequency point of a stored frequency point is acquired according to a registered network, the registered network is a mobile network on which the terminal registered last time, and the stored frequency point is a frequency point corresponding to the registered network.

A mobile network is searched for according to the equivalent frequency point, to determine a mobile network to be registered.

In an embodiment, the computer program, when being executed by the processor, further implements the following operations: operator information corresponding to the registered network is acquired according to the registered network; an equivalent frequency point list is acquired according to the operator information; and the equivalent frequency point is determined according to the equivalent frequency point list.

In an embodiment, the computer program, when being executed by the processor, further implements the following operations: an equivalent network enrolled by an operator corresponding to the operator information is acquired according to the operator information; and a set of frequency points prestored by the equivalent network is determined as the equivalent frequency point list.

In an embodiment, the computer program, when being executed by the processor, further implements the following operations: a frequency point of an operator network on which the terminal has registered is acquired according to the operator information; and the equivalent frequency point list is updated according to the frequency point of the registered operator network.

In an embodiment, the computer program, when being executed by the processor, further implements the following operations: a signal strength of a broadcast control channel corresponding to the equivalent frequency point is acquired according to the equivalent frequency point, and the mobile network to be registered is determined according to the signal strength of the broadcast control channel.

In an embodiment, in response to the signal strength of the broadcast control channel being greater than a preset threshold, a mobile network corresponding to the broadcast control channel is determined as the mobile network to be registered.

In an embodiment, in response to the signal strength of the broadcast control channel corresponding to the equivalent frequency point being not greater than a preset threshold, a signal strength of a broadcast control channel corresponding to a next equivalent frequency point is acquired, and the mobile network to be registered is determined according to the signal strength of the broadcast control channel corresponding to the next equivalent frequency point.

Those of ordinary skill in the art may understand that all or part of the processes in the above method embodiments may be implemented by a computer program instructing related hardware, and the computer program may be stored in a non-volatile computer-readable storage medium. When the computer program is executed, the flow of each of the method embodiments as described above may be included. Any reference to a memory, storage, a database or other media used in embodiments of the disclosure may include non-volatile and/or volatile memories. The non-volatile memory may include a Read Only Memory (ROM), a Programmable ROM (PROM), an Electrically Programmable ROM (EPROM), an Electrically Erasable Programmable ROM (EEPROM), or a flash memory. The volatile memory may include a Random. Access Memory (RAM) or an external cache memory. As illustration instead of limitation, the RAM may be obtained in multiple forms such as a Static RAM (SRAM), a Dynamic RAM (DRAM), a Synchronous DRAM (SDRAM), a Dual Data Rate SDRAM (DDR SDRAM), an Enhanced SDRAM (ESDRAM), a Synchlink DRAM (SLDRAM), a Rambus Direct RAM (RDRAM), a Direct Rambus Dynamic RAM (DRDRAM), and a Rambus Dynamic RAM (RDRAM), etc.

The technical features of the above embodiments may be combined in any combination, and in order to simplify the description, all possible combinations of the technical features of the above embodiments are not described. However, as long as there is no conflict between the combinations of these technical features, they should be considered to fall within the scope of the present specification.

The above embodiments only describe several implementations of the disclosure specifically and in detail, but cannot be understood as limitation to the scope of the present inventive patent. It should be pointed Out that those of ordinary skill in the art may also make several variations and improvements without departing from the concept of the disclosure. These variations and improvements fall within the scope of protection of the disclosure. Therefore, the scope of protection of the disclosure should be determined by the appended claims.

A1. A method for network search, including:
  acquiring an equivalent frequency point of a stored frequency point, the stored frequency point including a frequency point of a registered network; and
  searching far a mobile network according to the equivalent frequency point, to determine a mobile network to be registered.

A2. The method of item A1, wherein acquiring the equivalent frequency point of the stored frequency point includes:
acquiring, according to the registered network, operator information corresponding to the registered network;
acquiring an equivalent frequency point list according to the operator information; and
determining the equivalent frequency point according to the equivalent frequency point list.

A3. The method of item A2, wherein acquiring the equivalent frequency point list according to the operator information includes:
acquiring, according to the operator information, an equivalent network enrolled by an operator corresponding to the operator information; and
determining a set of frequency points prestored by the equivalent network as the equivalent frequency point list.

A4. The method of claim item A3, further including:
acquiring, according to the operator information, a frequency point of an operator network on which the terminal has registered; and
updating the equivalent frequency point list according to the frequency point of the registered operator network.

A5. The method of item A1, wherein searching for the mobile network according to the equivalent frequency point, to determine the mobile network to be registered includes:
acquiring, according to the equivalent frequency point, a signal strength of a broadcast control channel corresponding to the equivalent frequency point; and
determining the mobile network to be registered, according to the signal strength of the broadcast control channel.

A6. The method of item A5, wherein determining the mobile network to be registered, according to the signal strength of the broadcast control channel includes:
in response to the signal strength of the broadcast control channel being greater than a preset threshold, determining a mobile network corresponding to the broadcast control channel as the mobile network to be registered.

A7. The method of item A5, wherein determining the mobile network to be registered, according to the signal strength of the broadcast control channel further includes:
in response to the signal strength of the broadcast control channel corresponding to the equivalent frequency point being not greater than a preset threshold, acquiring a signal strength of a broadcast control channel corresponding to a next equivalent frequency point, and determining the mobile network to be registered, according to the signal strength of the broadcast control channel corresponding to the next equivalent frequency point.

A8. An apparatus for network search, including:
a memory storing processor-executable instructions; and
a processor configured to execute the stored processor-executable instructions to perform operations of:
acquiring an equivalent frequency point of a stored frequency point, the stored frequency point including a frequency point of a registered network; and
searching for a mobile network according to the equivalent frequency point, to determine a mobile network to be registered.

B9. The apparatus of item B8, wherein acquiring the equivalent frequency point of the stored frequency point includes:
acquiring, according to the registered network, operator information corresponding to the registered network;
acquiring an equivalent frequency point list according to the operator information; and
determining the equivalent frequency point according to the equivalent frequency point list.

B10. The apparatus of item B9, wherein acquiring the equivalent frequency point list according to the operator information includes:
acquiring, according to the operator information, an equivalent network enrolled by an operator corresponding to the operator information; and
determining a set of frequency points prestored by the equivalent network as the equivalent frequency point list.

B11. The apparatus of item B10, wherein the processor is configured to execute the stored processor-executable instructions to further perform operations of:
acquiring, according to the operator information, a frequency point of an operator network on which the terminal has registered; and
updating the equivalent frequency point list according to the frequency point of the registered operator network.

B12. The apparatus of item B8, wherein searching for the mobile network according to the equivalent frequency point, to determine the mobile network to be registered includes:
acquiring, according to the equivalent frequency point, a signal strength of a broadcast control channel corresponding to the equivalent frequency point; and
determining the mobile network to be registered, according to the signal strength of the broadcast control channel.

B13. The apparatus of item B12, wherein determining the mobile network to be registered, according to the signal strength of the broadcast control channel includes:
in response to the signal strength of the broadcast control channel being greater than a preset threshold, determining a mobile network corresponding to the broadcast control channel as the mobile network to be registered.

B14. The apparatus of item B12, wherein determining the mobile network to be registered, according to the signal strength of the broadcast control channel hither includes:
in response to the signal strength of the broadcast control channel corresponding to the equivalent frequency point being not greater than a preset threshold, acquiring a signal strength of a broadcast control channel corresponding to a next equivalent frequency point, and determining the mobile network to be registered, according to the signal strength of the broadcast control channel corresponding to the next equivalent frequency point.

C15. A non-transitory computer-readable storage medium having stored thereon computer-readable instructions that, when executed by a processor, cause the processor to perform a method for network search, the method including:
acquiring, an equivalent frequency point of a stored frequency point, the stored frequency point including a frequency point of a registered network; and
searching for a mobile network according to the equivalent frequency point, to determine a mobile network to be registered.

C16. The non-transitory computer-readable storage medium of item C15, wherein acquiring the equivalent frequency point of the stored frequency point includes:
acquiring, according to the registered network, operator information corresponding to the registered network;

acquiring an equivalent frequency point list according to the operator information; and determining the equivalent frequency point according to the equivalent frequency point list.

C17. The non-transitory computer-readable storage medium of item C16, wherein acquiring the equivalent frequency point list according to the operator information includes:

acquiring, according to the operator information, an equivalent network enrolled by an operator corresponding to the operator information; and determining a set of frequency points prestored by the equivalent network as the equivalent frequency point list.

C18. The non-transitory computer-readable storage medium of item C17, wherein the method further includes:

acquiring, according to the operator information, a frequency point of an operator network on which the terminal has registered; and updating the equivalent frequency point list according to the frequency point of the registered operator network.

C19. The non-transitory computer-readable storage medium of item C15, wherein searching for the mobile network according to the equivalent frequency point, to determine the mobile network to be registered includes:

acquiring, according to the equivalent frequency point, a signal strength of a broadcast control channel corresponding to the equivalent frequency point; and determining the mobile network to be registered, according to the signal strength of the broadcast control channel.

C20. The non-transitory computer-readable storage medium of item C19, wherein determining the mobile network to be registered, according to the signal strength of the broadcast control channel includes:

in response to the signal strength of the broadcast control channel being greater than a preset threshold, determining a mobile network corresponding to the broadcast control channel as the mobile network to be registered.

The invention claimed is:

1. A method for network search, comprising:

acquiring an equivalent frequency point of a stored frequency point, the stored frequency point comprising a frequency point of a registered network; and searching for a mobile network according to the equivalent frequency point, to determine a mobile network to be registered, wherein acquiring the equivalent frequency point of the stored frequency point comprises:

acquiring, according to the registered network operator information corresponding to the registered network;

acquiring an equivalent frequency point list according to the operator information; and determining the equivalent frequency point according to the equivalent frequency point list, wherein acquiring the equivalent frequency point list according to the operator information comprises:

acquiring according to the operator information, an equivalent network enrolled by an operator corresponding to the operator information; and determining a set of frequency points prestored by the equivalent network as the equivalent frequency point list.

2. The method of claim 1, further comprising:

acquiring, according to the operator information, a frequency point of an operator network on which the terminal has registered; and updating the equivalent frequency point list according to the frequency point of the registered operator network.

3. The method of claim 1, wherein searching for the mobile network according to the equivalent frequency point, to determine the mobile network to be registered comprises:

acquiring, according to the equivalent frequency point, a signal strength of a broadcast control channel corresponding to the equivalent frequency point; and determining the mobile network to be registered, according to the signal strength of the broadcast control channel.

4. The method of claim 3, wherein determining the mobile network to be registered, according to the signal strength of the broadcast control channel comprises:

in response to the signal strength of the broadcast control channel being greater than a preset threshold, determining a mobile network corresponding to the broadcast control channel as the mobile network to be registered.

5. The method of claim 3, wherein determining the mobile network to be registered, according to the signal strength of the broadcast control channel further comprises:

in response to the signal strength of the broadcast control channel corresponding to the equivalent frequency point being not greater than a preset threshold, acquiring a signal strength of a broadcast control channel corresponding to a next equivalent frequency point, and determining the mobile network to be registered, according to the signal strength of the broadcast control channel corresponding to the next equivalent frequency point.

6. An apparatus for network search, comprising:

a memory storing processor-executable instructions; and a processor configured to execute the stored processor-executable instructions to perform operations of:

acquiring an equivalent frequency point of a stored frequency point, the stored frequency point comprising a frequency point of a registered network; and searching for a mobile network according to the equivalent frequency point, to determine a mobile network to be registered, wherein acquiring the equivalent frequency point of the stored frequency point comprises:

acquiring according to the registered network operator information corresponding to the registered network;

acquiring an equivalent frequency point list according to the operator information; and determining the equivalent frequency point according to the equivalent frequency point list, wherein acquiring the equivalent frequency point list according to the operator information comprises:

acquiring, according to the operator information, an equivalent network enrolled by an operator corresponding to the operator information; and determining a set of frequency points prestored by the equivalent network as the equivalent frequency point list.

7. The apparatus of claim 6, wherein the processor is configured to execute the stored processor-executable instructions to further perform operations of:

acquiring, according to the operator information, a frequency point of an operator network on which the terminal has registered; and updating the equivalent frequency point list according to the frequency point of the registered operator network.

8. The apparatus of claim 6, wherein searching for the mobile network according to the equivalent frequency point, to determine the mobile network to be registered comprises:
acquiring, according to the equivalent frequency point, a signal strength of a broadcast control channel corresponding to the equivalent frequency point; and
determining the mobile network to be registered, according to the signal strength of the broadcast control channel.

9. The apparatus of claim 8, wherein determining the mobile network to be registered, according to the signal strength of the broadcast control channel comprises:
in response to the signal strength of the broadcast control channel being greater than a preset threshold, determining a mobile network corresponding to the broadcast control channel as the mobile network to be registered.

10. The apparatus of claim 8, wherein determining the mobile network to be registered, according to the signal strength of the broadcast control channel further comprises:
in response to the signal strength of the broadcast control channel corresponding to the equivalent frequency point being not greater than a preset threshold, acquiring a signal strength of a broadcast control channel corresponding to a next equivalent frequency point, and determining the mobile network to be registered, according to the signal strength of the broadcast control channel corresponding to the next equivalent frequency point.

11. A non-transitory computer-readable storage medium having stored thereon computer-readable instructions that, when executed by a processor, cause the processor to perform a method for network search, the method comprising:
acquiring an equivalent frequency point of a stored frequency point, the stored frequency point comprising a frequency point of a registered network; and
searching for a mobile network according to the equivalent frequency point, to determine a mobile network to be registered,
wherein acquiring the equivalent frequency point of the stored frequency point comprises:
acquiring, according to the registered network operator information corresponding to the registered network;
acquiring an equivalent frequency point list according to the operator information; and
determining the equivalent frequency point according to the equivalent frequency point list,
wherein acquiring the equivalent frequency point list according to the operator information comprises:
acquiring, according to the operator information an equivalent network enrolled by an operator corresponding to the operator information; and
determining a set of frequency points prestored by the equivalent network as the equivalent frequency point list.

12. The non-transitory computer-readable storage medium of claim 11, wherein the method further comprises:
acquiring, according to the operator information, a frequency point of an operator network on which the terminal has registered; and
updating the equivalent frequency point list according to the frequency point of the registered operator network.

13. The non-transitory computer-readable storage medium of claim 11, wherein searching for the mobile network according to the equivalent frequency point, to determine the mobile network to be registered comprises:
acquiring, according to the equivalent frequency point, a signal strength of a broadcast control channel corresponding to the equivalent frequency point; and
determining the mobile network to be registered, according to the signal strength of the broadcast control channel.

14. The non-transitory computer-readable storage medium of claim 13, wherein determining the mobile network to be registered, according to the signal strength of the broadcast control channel comprises:
in response to the signal strength of the broadcast control channel being greater than a preset threshold, determining a mobile network corresponding to the broadcast control channel as the mobile network to be registered.

15. The non-transitory computer-readable storage medium of claim 13, wherein determining the mobile network to be registered, according to the signal strength of the broadcast control channel further comprises:
in response to the signal strength of the broadcast control channel corresponding to the equivalent frequency point being not greater than a preset threshold, acquiring a signal strength of a broadcast control channel corresponding to a next equivalent frequency point, and determining the mobile network to be registered, according to the signal strength of the broadcast control channel corresponding to the next equivalent frequency point.

* * * * *